United States Patent [19]

Miller et al.

[11] Patent Number: 5,073,529
[45] Date of Patent: Dec. 17, 1991

[54] METHOD OF REGENERATING A NONACIDIC ZEOLITE CATALYST

[75] Inventors: Jeffrey T. Miller; Frank S. Modica, both of Naperville, Ill.; Sandra L. Cilluffo, Lafayette, Ind.; Victor K. Shum, Naperville, Ill.

[73] Assignee: Amoco Corporation, Chicago, Ill.

[21] Appl. No.: 453,666

[22] Filed: Dec. 20, 1989

[51] Int. Cl.$^5$ .................... B01J 29/38; B01J 23/96; B01J 38/20; C10G 35/095
[52] U.S. Cl. .................... 502/49; 208/140; 502/37; 502/50; 502/52; 585/419; 585/434
[58] Field of Search .................... 502/49, 52, 50, 37, 502/66, 74, 85; 208/140

[56] References Cited

U.S. PATENT DOCUMENTS

| | | | |
|---|---|---|---|
| 2,880,162 | 3/1959 | Moore | 208/140 |
| 4,141,817 | 2/1979 | McVicker et al. | 502/66 |
| 4,600,700 | 7/1986 | McHale | 502/50 |
| 4,621,069 | 11/1986 | Ganguli et al. | 502/49 |
| 4,721,694 | 1/1988 | Buss et al. | 502/74 |

Primary Examiner—Paul E. Konopka
Attorney, Agent, or Firm—Reginald K. Taylor; William H. Magidson; Ralph C. Medhurst

[57] ABSTRACT

A deactivated catalyst comprising a nonacidic zeolite and a Group VIII metal is regenerated by a two-step carbon burn process. The first oxidation step contacts the nonacidic zeolite catalyst with a halogen-free gaseous stream comprising oxygen and an inert gas at a first temperature sufficient to combust carbonaceous material while maintaining a substantial portion of the active Group VIII metal surface area withn the micropores of the nonacidic zeolite for a first period of time sufficient to substantially complete combustion of at least a portion the carbonaceous material at the first temperature. The second step contacts this nonacidic zeolite catalyst with a gaseous stream comprising oxygen and an inert gas at a second temperature sufficient to combust any remaining carbonaceous material for a second period of time sufficient to maintain a substantial portion of the active Group VIII metal surface area in the micropores of the nonacidic zeolite catalyst.

1 Claim, 4 Drawing Sheets

METHOD OF REGENERATING A NONACIDIC ZEOLITE CATALYST

FIELD OF THE INVENTION

The subject of the present invention is a method for regenerating a coke-deactivated reforming catalyst. The catalyst comprises a nonacidic zeolite having at least one Group VIII metal. More specifically, the present invention provides a two-step carbon burn procedure designed to regenerate this catalyst and restore the activity to the catalyst.

BACKGROUND OF THE INVENTION

Catalytic reforming is well-known in the petroleum industry as a method of treating naphtha fractions to improve octane ratings. Higher octane gasolines permit the use of engines that extract more power from the gasolines.

The typical catalytic reformer feedstock is composed of paraffins, olefins, naphthenes, and aromatics. The major reactions occurring during reforming of such a feedstock include (1) dehydrogenation of naphthenes to aromatics, (2) dehydrocyclization of paraffins to aromatics, (3) isomerization, and (4) hydrocracking. The basic dehydrogenation reactions are dehydrogenation of alkylcyclohexanes to aromatics, dehydroisomerization of alkylcyclopentanes to aromatics, and dehydrocyclization of paraffins to aromatics. These dehydrogenation reactions are highly endothermic and cause a decrease in temperature as the reaction progresses. The isomerization reactions convert normal paraffins to isoparaffins and convert alkylcyclopentanes to cyclohexanes plus subsequent conversion to aromatics. These isomerization reactions are relatively rapid reactions with small heat effects. The hydrocracking reactions produce high yields of light, gaseous hydrocarbons and consequently should be avoided because they decrease the yield of gasoline boiling range products.

Because of the complexity and number of reactions occurring in catalytic reforming, the reforming industry has developed highly specific catalysts tailored to convert only specific reaction species to aromatics. Recent work has been directed toward producing a catalyst for conversion of paraffinic hydrocarbons to aromatics through dehydrocyclization. As a result of lead phase down and demands on the petrochemical industry, $C_6$-$C_{10}$ aromatics have become highly desirable products.

One type of catalyst that has been successful in selectively converting $C_6$-$C_{10}$ paraffins to aromatics is a nonacidic zeolite-containing catalyst having a Group VIII metal component. Known catalysts of this type include L, X, and Y zeolites. U.S. Pat. No. 4,619,906 discloses dehydrocyclizing alkanes with a nonacidic zeolite-containing catalyst that has a Group VIII metal and a surface-deposited alkali metal. U.S. Pat. No. 4,435,283 discloses dehydrocyclizing alkanes with a nonacidic zeolite-containing catalyst having a Group VIII metal and an alkaline earth metal. U.S. Pat. No. 4,547,472 discloses a method of adding an alkaline earth metal to a nonacidic zeolite-containing catalyst having a Group VIII metal component.

Deactivation of these types of catalysts can be attributed in part to the deposition of carbonaceous material onto the surface of such catalysts during reforming conditions. These conditions include pressures ranging from about 1-1000 psi, temperatures ranging from about 850-1200 deg. F., liquid hourly space velocity of hydrocarbons ranging from about 0.1-10 $hr^{-1}$, and hydrogen to hydrocarbon molar ratios ranging from about 1:1 to 10:1.

If these reforming conditions are too severe, deactivation of the catalysts can also occur due to a decrease in the amount of Group VIII metal surface area available for reaction with the hydrocarbon feed. Such a decrease can be caused by high localized temperatures mobilizing the Group VIII metal atoms located inside the micropores of the nonacidic zeolite. Once mobilized, these metal atoms can move outside the pores of the zeolite, contact each other, and agglomerate (much like two drops of water agglomerate to form a bead of water). The result can be an increase in the size of existing Group VIII metal agglomerates (or clusters) or an increase in the number of new agglomerates formed. Platinum-containing nonacidic zeolite catalyst compositions characterized by such a decrease in the platinum surface area have exhibited poor performance in the dehydrocyclization of $C_6$-$C_{10}$ paraffins to aromatics. Such performance is usually characterized by low activities and/or low selectivity to desired products. Although deactivation of platinum-containing nonacidic zeolites due to platinum agglomeration can occur, the major contributor to the deactivation of these catalysts is coke deposition. It is well known that coke deactivation can be reversed by contacting the catalyst with a gaseous oxygen-containing stream at a temperature of 700-1100 deg. F. This is known as a carbon burn or oxidation step. Ironically, the carbon burn step itself can agglomerate the platinum if the temperature in the catalyst bed is too high and if the platinum is exposed to such a temperature for a long period of time.

In U.S. Pat. No. 3,753,926, there is disclosed a catalyst regeneration method which utilizes a carbon burn step. In this carbon burn step, the deactivated, platinum-containing hydrocarbon conversion catalyst is contacted with a gaseous mixture that contains an oxygen component to reverse the deactivation resulting from coke deposition. In addition, this catalyst is contacted with a halogen-containing gas to redisperse the agglomerated platinum resulting from platinum agglomeration. The process described in U.S. Pat. No. 3,753,926 differs from the instant invention in that in the instant invention the gaseous stream contacting the catalyst does not contain any halogen. Halogen-containing gases can require the use of expensive chlorine resistant reactor materials and can cause undesirable acidity in the zeolite catalyst.

In U.S. Pat. No. 4,645,751, another carbon burn procedure is disclosed for regenerating a Group VIII metal-containing zeolite catalyst that has been deactivated by coke deposition. This carbon burn procedure advocates contacting the catalyst with oxygen at 1000 deg. F. and higher temperatures, followed by contacting the catalyst with a hydrogen halide-containing gas to aid in redispersing the platinum. The use of such high temperatures during the carbon burn step can result in loss of activity due to platinum agglomeration. The use of hydrogen halide gas can result in more expensive reactor materials and a more acidic catalyst.

U.S. Pat. No. 4,689,312 discloses a three-step procedure for regenerating an aged platinum-zeolite beta-alumina catalyst in the presence of an aged NiW zeolite beta catalyst. In the first step, the platinum-zeolite is contacted with hydrogen at 1000 psig and at 950 deg. F.

for 24 hr. In the second step, the platinum-zeolite is contacted with $O_2$ at 600 psig at a temperature of 650-800 deg. F. The third step consists of contacting the platinum zeolite with $O_2$ at 850 deg. F. for 12 hr.

There are at least two differences between the present invention and the regeneration process disclosed in U.S. Pat. No. 4,689,312. First, the present invention is a method of regenerating a nonacidic zeolite, whereas the catalyst regenerated in U.S. Pat. No. 4,689,312 is an acidic zeolite. This difference is important because nonacidic and acidic zeolites behave differently in the presence of platinum and sulfur. For example, in a nonacidic platinum-containing zeolite, the platinum must be located inside the micropores of the zeolite in order to properly perform its function of converting paraffins to aromatics; however, in an acidic platinum-containing zeolite, the platinum can properly perform its function of converting paraffins to olefins without necessarily being located inside the micropores of the zeolite. In regards to sulfur, in a nonacidic platinum-containing zeolite, the zeolite must be sulfur-free, i.e., less than about 50 ppm by weight, in order to convert paraffins to aromatics; however, an acidic platinum-containing zeolite can perform its function of converting paraffins to olefins in the presence of about 1-5% by weight of sulfur.

Second, in the first oxidation step of the present invention, the temperature must be maintained at a temperature that combusts the carbon while maintaining a substantial portion of the active platinum surface area within the micropores of the nonacidic zeolite. In U.S. Pat. No. 4,689,312, the first oxidation step of the regeneration procedure exposes the catalyst to too high of a temperature for too long a period of time. As a result, a significant portion of the active platinum migrated outside of the micropores of the zeolite, thereby causing the platinum to agglomerate. Not only are platinum agglomerates formed in the U.S. Pat. No. 4,689,312 regeneration procedure, but the procedure requires the presence of an aged hydrotreating catalyst (NiW-zeolite beta catalyst) to decrease the size of the platinum agglomerates.

There is a need for a method of regenerating a nonacidic zeolite-containing catalyst impregnated with at least one Group VIII metal that maintains a substantial portion of the active Group VIII metal surface area in the micropores of the zeolite. There is a need for a method of regenerating a nonacidic Group VIII metal-containing zeolite catalyst that does not include contacting the catalyst with halogen-containing gases to redisperse or reduce the size of Group VIII metal agglomerates or clusters.

SUMMARY OF THE INVENTION

The present invention is a two-step carbon burn method for regenerating a catalyst comprising a nonacidic zeolite and a Group VIII metal. A substantial portion of the active Group VIII metal surface area is positioned within the micropores of the nonacidic zeolite. This nonacidic zeolite catalyst, having been deactivated by deposition of a carbonaceous material as a result of previous contact of the nonacidic zeolite with a hydrocarbon feedstock in the presence of hydrogen at reforming conditions, is first contacted with a halogen-free gaseous stream comprising oxygen and an inert gas at a first temperature sufficient to combust the carbonaceous material while maintaining a substantial portion of the active Group VIII metal surface area within the micropores of the nonacidic zeolite. This first step is continued for a first period of time sufficient to substantially complete combustion of at least a portion of the carbonaceous material at the first temperature. In the second step, the catalyst is contacted with a halogen-free gaseous stream comprising oxygen and an inert gas at a second temperature sufficient to substantially complete combustion of any remaining carbonaceous material. This second step is continued for a second period of time sufficient to maintain a substantial portion of the active Group VIII metal surface area within the micropores of the nonacidic zeolite.

In a first embodiment, the two-step carbon burn process regenerates a platinum L zeolite catalyst. A substantial portion of the active platinum surface area is positioned within the micropores of the L zeolite. This catalyst, having been deactivated by deposition of a carbonaceous material as a result of previous contact of said nonacidic zeolite with a hydrocarbon feedstock in the presence of hydrogen at reforming conditions, is first contacted with a halogen-free gaseous stream consisting essentially of oxygen and nitrogen at a first temperature sufficient to combust the carbonaceous material while maintaining a substantial portion of the active platinum surface area within the micropores of the L zeolite. This first step is continued for a first period of time sufficient to substantially complete combustion of at least a portion of the carbonaceous material at the first temperature. In the second step, this catalyst is contacted with a halogen-free gaseous stream consisting essentially of oxygen and nitrogen at a second temperature sufficient to substantially complete combustion of any remaining carbonaceous material. This second step is continued for a second period of time sufficient to maintain a substantial portion of the active platinum surface area within the micropores of the L zeolite.

In a second embodiment, the method regenerates a sulfur-free platinum L zeolite catalyst. A substantial portion of the active platinum surface area is positioned in the micropores of the L zeolite. Further, this catalyst has been deactivated by deposition of a carbonaceous material as a result of previous contact of the L zeolite catalyst with a hydrocarbon feedstock comprising $C_6-C_8$ nonaromatic hydrocarbons in the presence of hydrogen at reforming conditions. In the first step, the catalyst is cooled to a temperature of less than about 700 deg. F. In the second step, the catalyst is contacted with a gaseous stream consisting essentially of oxygen and nitrogen at a first temperature of about 500-700 deg. F to combust the carbonaceous material while maintaining at least about 80% of the active platinum surface area within the micropores of the L zeolite. The gaseous stream has a halogen concentration of less than about 10 ppm. This second step is continued for a first period of time of about 3 to 72 hr to substantially complete combustion of at least a portion of the carbonaceous material at the first temperature. This gaseous stream also has a halogen concentration of less than about 10 ppm. In the third step, the catalyst is contacted with a gaseous stream consisting essentially of oxygen and nitrogen at a second temperature of about 850-950 deg. F. to substantially complete combustion of any remaining carbonaceous material. This third step is continued for a second period of time of about 0.5 to 10 hr to maintain at least about 80% of the active platinum surface area within the micropores of the L zeolite.

DESCRIPTION OF THE PREFERRED EMBODIMENT

Figure 1:
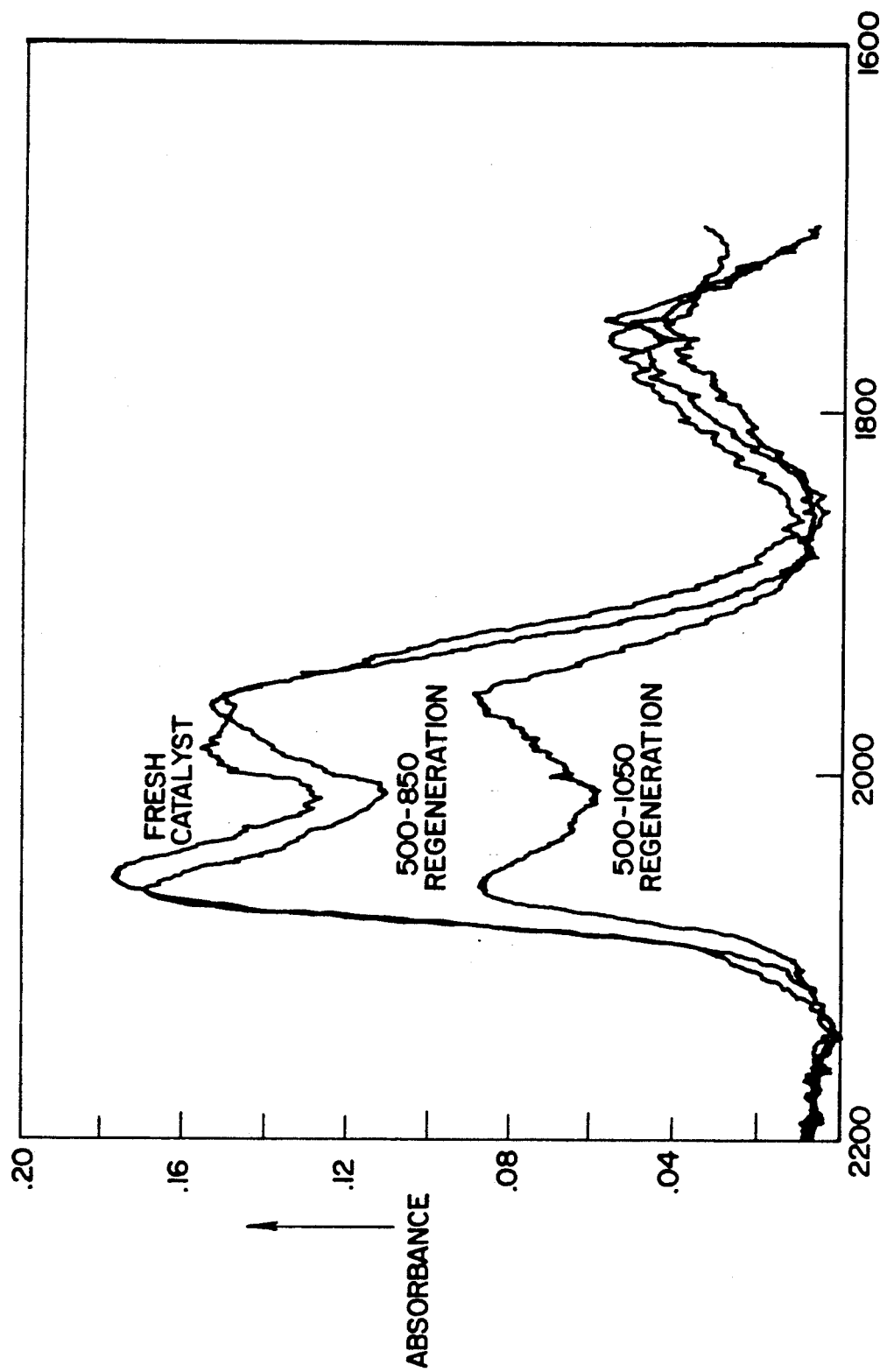
FIG. 1 is the infrared absorption spectrum of CO adsorbed on platinum in an L zeolite. The top curve is an absorption spectrum of a fresh Pt/Ba (K) L zeolite, the middle curve is an absorption spectrum of a Pt/Ba (K) L zeolite regenerated using a two-step 500 deg. F. and 850 deg. F. method (the present invention) and the lower curve is an absorption spectrum of a Pt/Ba (K) L zeolite regenerated using a two-step 500 deg. F. and 1050 deg. F. method.

In accordance with the present invention, a catalyst comprising a nonacidic zeolite impregnated with at least one Group VIII metal is regenerated using a two-step carbon burn procedure. In the first step, this nonacidic zeolite catalyst is contacted with a gaseous stream comprising oxygen and an inert gas at a first temperature sufficient to combust carbonaceous material while maintaining a substantial portion of the active Group VIII metal surface area within the micropores of the nonacidic zeolite for a period of time sufficient to substantially complete combustion of at least a portion of the carbonaceous material that can be removed at that first temperature. In the second step, this nonacidic zeolite catalyst is contacted with a gaseous stream comprising oxygen and an inert gas at a second temperature sufficient to combust any remaining carbonaceous material for a period of time sufficient to maintain a substantial portion of the active Group VIII metal surface area within the micropores of the nonacidic zeolite.

An essential feature of the catalyst of the present invention is that the catalyst comprises a nonacidic zeolite. This means that the zeolite has substantially all of its cationic sites of exchange occupied by nonhydrogen cationic species, preferably alkali or alkaline earth metals. Regardless of the cationic species actually present in the sites of exchange, the nonacidic zeolite of the present invention has substantially all of the cationic sites occupied by nonhydrogen cations.

The term "micropore" refers to a channel-like interstice in the nonacidic zeolite having a diameter of less than about 20 Angstroms. The preferred nonacidic zeolite is a large-pore zeolite. "Large-pore zeolite" is defined as a zeolite having an effective pore diameter greater than about 6 Angstroms. Examples of nonacidic large-pore zeolites suitable for use in this invention are L zeolite, omega zeolite, X zeolite, Y zeolite, and mordenite, preferably L and omega zeolite. The nonacidic zeolite of the present invention can comprise the sodium forms of omega, X zeolite, Y zeolite or mordenite, or the potassium form of L zeolite. An especially preferred nonacidic zeolite is the barium-exchanged form of L zeolite.

Examples of suitable support matrices useful for binding zeolite-containing catalysts are clays; bauxite; and refractory inorganic oxides such as alumina, zirconium dioxide, hafnium oxide, titanium dioxide, zinc oxide, magnesia, silica-magnesia, alumina, and silica. Preferred support matrices are silica and alumina. It is also preferred that the support matrix be essentially inert to reactants. In addition, it is preferred that the support matrix be nonacidic to avoid the promotion of undesirable side reactions.

Examples of suitable means of binding the nonacidic zeolite with the support matrix are pilling, extruding, and granulating. Irrespective of the method of binding the nonacidic zeolite in the support matrix, a catalytic composite should comprise from about 20 to about 100 wt.% nonacidic zeolite based on the combined weight of the zeolite and support matrix. The specific amount of nonacidic zeolite included in the catalytic composite of the invention will be a function of the specific nonacidic zeolite, the support matrix, and the specific application of the catalytic composite.

Another essential feature of the catalyst of the present invention is the presence of catalytically effective amounts of a Group VIII metal such as ruthenium, rhodium, osmium, palladium, iridium, platinum, or mixtures thereof, particularly mixtures of platinum and palladium. The preferred Group VIII metal is platinum. An amount of Group VIII metal suitable for use in this invention ranges from about 0.1% to about 5.0% by weight of the zeolite. In the case of platinum, a suitable amount can be from about 0.1% to about 5% by weight of the zeolite. The Group VIII metal component may be composited with the other constituents of the catalytic composite by any suitable means known in the art, for example, ion exchange or impregnation.

The catalyst of the present invention can comprise also an alkali or alkaline earth metal. Any of the alkali metals may be used including lithium, sodium, potassium, rubidium, cesium, and any mixtures thereof, preferably potassium. Examples of alkaline earth metals suitable for use in this invention are barium, strontium, calcium, and any mixtures thereof, preferably barium. Barium is preferred to the other alkaline earth metals because it results in a less acidic catalyst. Strong acidity is undesirable in the catalyst of the present invention because it promotes cracking, resulting in lower selectivity. The alkali or alkaline earth metals can be incorporated into the zeolite by synthesis, impregnation, or ion exchange. The alkali or alkaline earth metals can constitute from about 0.1% to about 15% of the weight of the zeolite.

Deactivation of the catalyst of the present invention occurs as a result of contacting this zeolite catalyst with a hydrocarbon feedstock at reforming conditions. A wide range of hydrocarbon feedstocks may be employed in the process of the present invention. Typically, hydrocarbon feedstocks which may be used in the present invention will contain naphthenes and paraffins, although in some cases aromatics and olefins can be present. Accordingly, hydrocarbon feedstocks suitable for use in this invention include straight-run naphthas, virgin naphthas, synthetic naphthas, and the like. The preferred hydrocarbon feedstock comprises $C_6$–$C_8$ nonaromatic hydrocarbon. The hydrocarbon feedstock employed in the present invention can be treated to remove substantially all zeolite catalyst poisons, such as sulfur-, nitrogen, and oxygen-containing contaminants therefrom.

Typical reforming conditions suitable for use in this invention include a temperature of about 500 deg. F. to about 1500 deg. F., a pressure of from 1 to about 100 atmospheres, a liquid hourly space velocity of about 0.1 $hr^{-1}$ to 15 $hr^{-1}$, and a hydrogen to hydrocarbon ratio from about 0.5:1 to 30:1.

A preferred application of the catalyst of the present invention is its use as a dehydrocyclization catalyst, in particular for the dehydrocyclization of $C_6$–$C_8$ nonaromatic hydrocarbons. Accordingly, a hydrocarbon feedstock comprising $C_6$–$C_8$ nonaromatic hydrocarbons can be contacted with the catalyst of the present invention at dehydrocyclization conditions. Dehydrocyclization conditions include a pressure of from 1 to about 1000 psi, with a preferred pressure being from about 1–300 psi; a temperature from about 800 deg. F. to 1200 deg. F.; and a liquid space velocity from about 0.1 $hr^1$ to 10 $hr^{-1}$, preferably about 0.1 $hr^{-1}$ to 5 $hr^{-1}$. Hydrogen may be circulated at a rate from about 0.1 to 10 moles of hydrogen per mole of charge feedstock, preferably about 0.5 to 4.

This process of contacting the catalyst of the first invention with the hydrocarbon feedstock under dehydrocyclization conditions may be accomplished using the catalyst in a fixed-bed system, a moving-bed system, a fluidized-bed system or in a batch-type operation. The hydrocarbon feedstock and hydrogen can be preheated by any suitable heating means to the desired reaction temperature prior to passing it into a conversion zone containing the catalyst. The catalyst conversion zone may be one or more separate reactors with suitable means therebetween to ensure that the desired conversion temperature is maintained at the entrance to each reactor. The hydrocarbon feedstock may be contacted with the catalyst bed in either upward, downward, or radial flow.

Deactivation of the catalyst of the present invention occurs when the activity, selectivity, and stability of the catalyst decreases to unacceptable levels. Activity is a measure of the catalyst's ability to convert hydrocarbon reactants into products at specified operating conditions. Selectivity refers to the amount of the desired products obtained as a function of the amount of reactants converted or changed. Stability refers to the rate of change with time of the activity and selectivity parameters. Initially, the selectivity, activity, and stability of the reforming catalyst are quite acceptable; however, the gradual accumulation of coke and other deactivating carbonaceous deposits on the catalyst will inevitably reduce the activity and selectivity of the catalyst to unacceptable levels. This usually occurs when the catalyst becomes coated with about 0.5 to 15% or more of carbonaceous deposits. Once the performance of the catalyst has decayed to an unacceptable level, it is necessary to cease the introduction of the hydrocarbon feedstock into the catalyst zone.

Prior to regenerating the catalyst using the present invention, the catalyst bed is purged with a suitable gas stream. The purpose of the purge gas is to rid the catalyst zone of any hydrocarbons that may be left over after reforming conditions have ceased. Examples of suitable purge gases are hydrogen and nitrogen.

After purging the catalyst bed, the present invention can be used to regenerate this catalyst. The regeneration of the catalyst can be accomplished while the catalyst is in the reforming reactor or outside the reforming reactor by removing the catalyst from the reforming reactor and regenerating externally. Any gas streams contacting the catalyst during regeneration should be substantially free of nonacidic zeolite poisons, particularly sulfur compounds, such as oxides of sulfur and $H_2S$.

In the first step of the present invention, the nonacidic zeolite catalyst is contacted with a halogen-free gaseous stream comprising oxygen and an inert gas. In other words, the gaseous stream comprises oxygen as the sole decoking agent. Halogen-free is defined as a halogen concentration of less than 10 ppm by weight, preferably less than about 1 ppm by weight. Inert gases suitable for use in this invention are nitrogen, helium, carbon dioxide, and the like gases, or mixtures thereof. The amount of oxygen present in the gaseous stream can range from about 0.1 mole % to about 21 mole %, preferably about 0.5 to about 2 mole %. A gas hourly space velocity suitable for use in this invention ranges from about 100 $hr^{-1}$ to about 10,000 $hr^{-1}$. The oxygen concentration and the space velocity can be constant or varied.

The first step of the present invention occurs at a temperature sufficient to combust the carbonaceous material deposited on the nonacidic zeolite catalyst while maintaining a substantial portion of the active Group VIII metal surface area within the micropores of the nonacidic zeolite catalyst. Substantial portion is defined as at least about 80%, preferably greater than about 90%, more preferably greater than about 95%. This temperature, hereafter referred to as the first temperature, is defined as the average catalyst bed temperature during the first oxidation step. The first temperature can vary depending on the oxygen concentration and the gas hourly space velocity. A first temperature suitable for use in the present invention can range from about 500 to 700 deg. F., preferably about 500–600 deg. F., more preferably about 500 deg. F. Since the average catalyst bed temperature during reforming is typically higher than the first temperature, the catalyst may have to be cooled to a temperature of less than about 700 deg. F. prior to the first oxidation step.

The length of the first oxidation step can vary depending upon the size of the reactor, the amount of the catalyst, and the amount of the carbonaceous material deposited on the catalyst. This length of time, hereafter referred to as the first period, is defined as the length of time that the catalyst is exposed to the first temperature. A typical range for the first period can be about 3–72 hr, preferably about 10–20 hr, more preferably about 16 hr. Primarily, the first period will depend on how long it takes to substantially complete combustion of the carbonaceous material capable of being removed at the first temperature. The point in time at which this occurs can be determined by monitoring the carbon dioxide and/or oxygen concentration of the gaseous stream exiting the reactor during regeneration. The carbon dioxide concentration will decrease and the oxygen concentration will increase as this point is neared. Another method of determining when this point is neared is by monitoring the first temperature and noting when it levels off.

Removing as much carbon as possible from the catalyst at the first temperature reduces the amount of heat generated by the combustion of the carbonaceous material during regeneration. This in turn reduces sintering of the Group VIII metal.

In the second step of this two-step carbon burn procedure, the nonacidic zeolite catalyst is contacted with a halogen-free gaseous stream comprising oxygen and an inert gas. The concentrations of the oxygen and the inert gas and the types of inert gases are the same as in the first step. This second step must occur at a temperature that is sufficient to substantially complete combustion of any remaining carbonaceous material. This temperature is known as the second temperature and is defined as the average catalyst bed temperature during the second oxidation step. Substantially complete is defined as greater than about 80%, preferably greater than about 90%, more preferably greater than about 95%. The second temperature, which will be higher than the first temperature, can vary depending upon the oxygen concentration of the gaseous stream and the gas space velocity. A typical range for this second temperature can be from about 850–950 deg. F., preferably about 900–950 deg. F., more preferably about 900 deg. F.

The time for which the catalyst is exposed to this second temperature is known as the second period. The length of the second period is such that a substantial portion of the active Group VIII metal surface area is maintained within the micropores of the nonacidic zeolite. Unlike the first oxidation step, in the second oxidation step, it is critical to regulate both the temperature and the length of time the catalyst is exposed to such a temperature in order to fully regenerate the catalyst. Typically, the second period can be from about 0.5–10 hr, preferably about 0.5–1.5 hr, more preferably about 1.5 hr.

After the two-step carbon burn procedure is completed, the catalyst is purged with nitrogen or another inert gas to displace oxygen, water, and carbon dioxide.

After the purge step, the catalyst is reduced by contacting it with a hydrogen stream at a temperature from about 500 to 1100 deg. F. for a period of about 0.5 to about 5 hr.

The present invention is not limited to any particular type of regeneration. For example, it can be continuous, cyclic, or semi-regenerative.

An essential feature of the present invention is maintaining the active Group VIII metal surface area within the micropores of the nonacidic zeolite of the catalyst of present invention during regeneration. Applicants have discovered that there is a direct relationship between the amount of active Group VIII metal surface area located within the micropores of a nonacidic zeolite and the activity of the catalyst. Catalysts having a substantial amount of active Group VIII metal surface area located outside the micropores of the nonacidic zeolite correlate to low activities, whereas catalysts having a substantial amount of active Group VIII metal surface area located within the micropores of the nonacidic zeolite correlate to high activities. It is assumed that if the active Group VIII metal is located within the micropores, the Group VIII metal is dispersed and not agglomerated.

The amount of active Group VIII metal surface area located inside the micropores of the nonacidic zeolite can be determined using infrared spectroscopy and transmission electron microscopy. In regards to infrared spectroscopy, the spectra of CO adsorbed by platinum in an L zeolite catalyst is profoundly different from the spectrum of platinum on other catalysts. Consequently, infrared spectroscopy can be used to determine whether platinum is present inside the micropores of a nonacidic zeolite. The most distinct feature of this spectra is the doublet structure in the region of 1,950 to 2,050 $cm^{-1}$ as shown in FIG. 1. This spectral feature has not been reported for other platinum-supported catalysts, i.e., $Pt/SiO_2$ and $Pt/Al_2O_3$. The second band of the doublet at 1950 $cm^1$ is specific to platinum in an L zeolite. The following paragraphs will show how the intensity of this second band can be correlated to the amount of active platinum surface area located in the micropores of the L zeolite.

The CO absorbance spectrum shown in FIG. 1 was prepared by grinding 0.1 g of an L zeolite catalyst into a 1 ¼ in disk. After inserting the disk into a quartz sample holder, the sample was evacuated to a pressure of less than $10^{-4}$ Torr. Next, the sample chamber was pressured to 50 Torr $H_2$ and heated to 480 deg. C. for 1 hr. After reduction in $H_2$, the sample was evacuated at $10^{-4}$ Torr for 15 min at 480 deg. C. The sample was then cooled to room temperature and inserted into an infrared beam. A backround spectrum was recorded and stored on a Beckman 4260 Fourier Transform Infrared Spectrometer. The sample was then exposed to 8.0 Torr of carbon monoxide and, a spectrum having wavelenghts ranging from 2200 to 1700 $cm^{-1}$ was recorded. The backround spectrum of the reduced catalyst was subtracted from the spectrum of the catalyst exposed to carbon monoxide to produce the infrared spectrum shown in FIG. 1.

Figure 2:
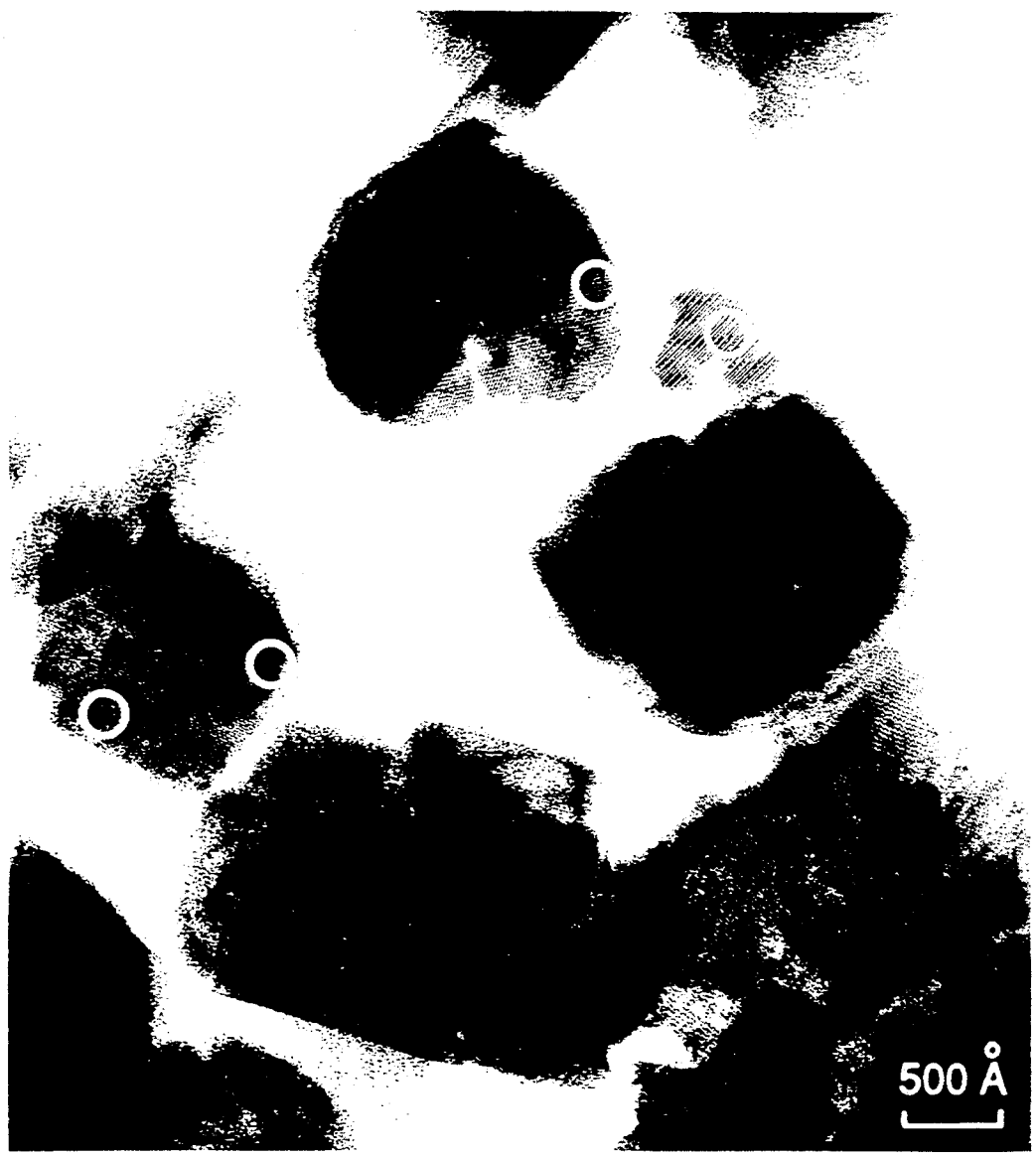
FIG. 2 is an electron micrograph of a fresh 1.2 wt% platinum-supported L zeolite catalyst. The platinum particles are circled. This figure corresponds to the top curve in FIG. 1.
Figure 3:
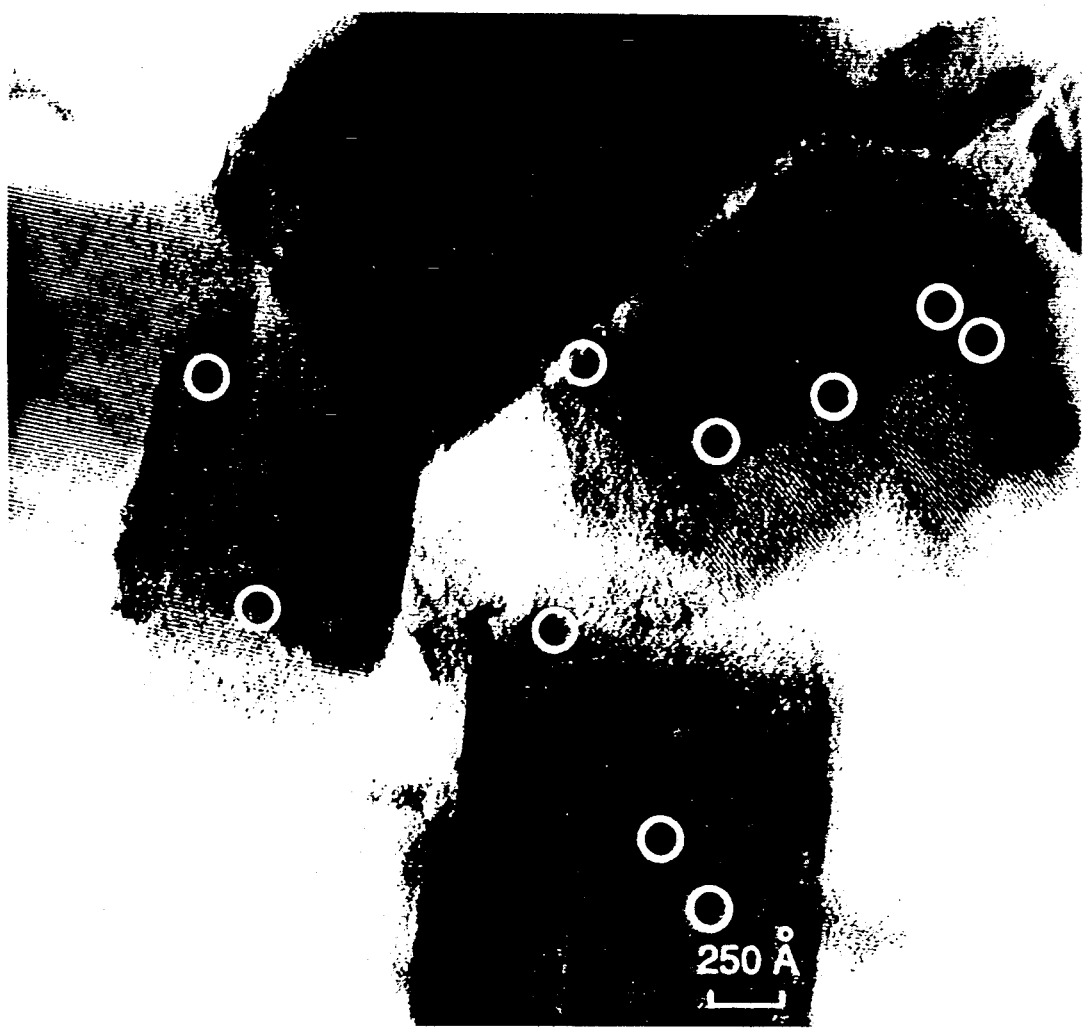
FIG. 3 is an electron micrograph of a 1.2 wt% platinum-supported L zeolite catalyst that has been regenerated using the present invention. In the first step, the catalyst is contacted with air at 500 deg. F. In the second step, the catalyst is contacted with air at 850 deg. F. The platinum particles are circled. This figure corresponds to the middle curve in FIG. 1.
Figure 4:
FIG. 4 is an electron micrograph of a 1.2 wt% platinum-supported L zeolite catalyst after a two-step regeneration technique. In the first step, the catalyst is contacted with air at 500 deg. F. In the second step, the catalyst is contacted with air at 1050 deg F. The platinum particles are circled. This figure corresponds to the lower curve in FIG. 1.

By correlating the infrared spectra shown in FIG. 1 with the corresponding electron micrographs shown in FIGS. 2–4, a determination can be made of how much of the active platinum surface area is located in the micropores of a fresh L zeolite catalyst (top curve), an L zeolite catalyst regenerated using the present invention (middle curve), and an L zeolite regenerated using a prior regeneration method (bottom curve). In FIGS. 2–4, it is assumed that the observed platinum particles (circled) are outside the micropores of the L zeolite and the remaining or unobserved platinum particles are inside the micropores of the L zeolite.

The top curve of FIG. 1 shows that a fresh L zeolite catalyst has an absorbance level of about 0.15 at a wavelength of 1950 $cm^{-1}$ (the second band of the doublet). FIG. 2, the corresponding electron micrograph, shows that the observed platinum particles are very small in diameter, e.g., less than about 20 Angstroms. FIG. 2 suggests that almost all of the platinum resides inside the micropores of the L zeolite.

The middle curve of FIG. 1 is the infrared spectrum of an L zeolite catalyst that was regenerated using the present invention, i.e., contacting the deactivated L zeolite catalyst with air at 500 deg. F. for a first period of time and with air at 850 deg. F. for a second period of time. FIG. 3 is the corresponding electron micrograph. According to FIG. 1, in comparison to a fresh L zeolite catalyst, an L zeolite catalyst regenerated using the present invention has approximately the same absorbance level (0.15) at a wavelength of 1950 $cm^{-1}$. Comparing FIGS. 2 and 3, the sizes of the observed platinum particles of the fresh L zeolite catalyst are about the same as the sizes of the observed platinum particles of the L zeolite regenerated using the present invention. FIG. 3 suggests that in the L zeolite regenerated using the present invention, almost all of the active platinum surface area resides inside the micropores of the L zeolite. This is significant because L zeolite catalysts having a substantial amount of the active platinum surface area located inside the micropores of the L zeolite have been correlated with high relative activities.

The lower curve of FIG. 1 is the infrared spectrum of an L zeolite catalyst that was regenerated using a two-step method where the temperature of the second step is too high. FIG. 4 is the corresponding electron micrograph. According to FIG. 1, in comparison to a fresh catalyst, a catalyst regenerated using this prior art method has an absorbance level of about 0.9. This is approximately 40% less than the intensity level of the fresh L zeolite catalyst and the L zeolite catalyst regenerated using the present invention. FIG. 4 illustrates that the sizes of the observed platinum particles have substantially increased to sizes of up to 250 Angstroms. The combination of the bottom curve in FIG. 1 and FIG. 4 suggest that the platinum particles that were located inside the micropores of the L zeolite migrated out of these micropores during regeneration and agglomerated with each other forming large-sized platinum particles that can be detected more readily with electron microscopy. This migration of the platinum particles, presumably caused by the higher oxidation temperature (1050 deg. F.), is important because L zeolite catalyst having a substantial amount of active platinum surface area located outside the micropores of the L zeolite have been correlated with low relative activities.

Other analytical methods suitable for use in determining the amount of active platinum surface area located in the micropores of an L zeolite are $^{129}$Xe NMR spectrocopy, energy dispersive X-ray spectroscopy, and Extended X-ray Absorption Fine Structure Spectroscopy (EXAFS). The following examples are given to illustrate further the present invention and to indicate the benefits which are realized through the utilization thereof. The purpose of these examples is solely for illustration.

EXAMPLE 1

75 g of (K) L zeolite was impregnated with 1.80 g of $Pt(NH_3)_4(NO_3)_2$ in 49 ml of water. The catalyst was dried at 250 deg. F. To 65.4 g of this material was added 16.4 g of Cabosil silica. The zeolite/silica was extruded to form 1/16 in extrudates. The extrudates were dried at 250 deg. F.

The conversion of n-hexane was carried out using 2.0 g of 14/20 mesh catalyst in a fixed continuous flow reactor under atmospheric hydrogen. The reactor was a 1.4 cm ID×45 cm tubular quartz reactor with an internal thermowell. The hydrogen flow rate was 150 ml per min. N-hexane was delivered by a syringe pump at 2.0 g/hr (WHSV=1.0 hr$^{-1}$ and 4.0 m per hr (WHSV)=2.0 hr$^{-1}$. The reaction temperature was 750 deg. F. The reaction products were analyzed by off-line gas chromatography. The catalysts were prereduced at 900 deg. F. for approximately 60 min.

The hexane conversion, benzene selectivity, and reaction products for the fresh catalyst are given in Table 1. Hexane conversion is defined as 100 minus all hexane isomers (isohexane and n-hexane). For example, as shown in Table 1, the hexane conversion at a gas hourly space velocity of 1 is 100−(16.5+6.0)=77.5. Benzene selectivity is defined as the wt% benzene divided by the hexane conversion. For example, as shown is Table 1, the benzene selectivity at a gas hourly space velocity of 1 is 66.4/77.5×100=86. Relative activity is defined as the space velocity required by the catalyst to achieve a given conversion of n-hexane divided by the space velocity required by a reference (fresh) catalyst to achieve the same conversion (all other process conditions being the same). For example, a catalyst that has a relative activity of 0.5 will need a space velocity that is one half the space velocity of the reference catalyst in order to achieve the same n-hexane conversion. Since space velocity is defined as the feed rate of hydrocarbons divided by the amount of catalyst, reducing the space velocity by one half can be accomplished by either reducing the hydrocarbon feed rate by one half or using twice as much catalyst.

TABLE 1

| N-Hexane Conversion at 750 deg. F. Under Atmospheric $H_2$ | | |
|---|---|---|
| Catalyst, Fresh (Relative Activity 1.0) | | |
| WHSV, hr$^{-1}$ | 1.0 | 2.0 |
| Reaction Products (wt %) | | |
| $CH_4$ | 1.8 | 1.9 |
| $C_2H_6$ | 1.4 | 1.4 |
| $C_3H_8$ | 2.1 | 2.2 |
| $iC_4H_{10}$ | 0.2 | 0.2 |
| $nC_4H_{10}$ | 1.6 | 1.7 |
| $iC_5H_{12}$ | 0.5 | 0.4 |
| $nC_5H_{12}$ | 3.5 | 3.4 |
| $iC_6H_{14}$ | 18.5 | 20.5 |
| $nC_6H_{14}$ | 6.0 | 11.7 |
| Benzene | 66.4 | 56.6 |
| Total Hexane Conversion | 75.5 | 67.8 |
| Benzene Selectivity | 88 | 83 |

After determination of the initial hexane conversion and benzene selectivity, the catalyst was reacted with n-hexane in $N_2$ (150 ml/min) at 750 deg. F. for 2 ½ hr. This treatment accelerated the deposition of coke on the catalyst. After coking, the catalyst was tested for hexane conversion in $H_2$ as before and had a relative activity of 0.4. The hexane conversion, benzene selectivity, and reaction products for the coked catalyst are shown in Table 2.

TABLE 2

| N-Hexane Conversion at 750 deg. F. Under Atmospheric $H_2$ | |
|---|---|
| Catalyst Coked (Relative Activity 0.4) | |
| WHSV, hr$^{-1}$ | 2.0 |
| Reaction Products (wt %) | |
| $CH_4$ | 0.6 |
| $C_2H_6$ | 0.5 |
| $C_3H_8$ | 0.7 |
| $iC_4H_{10}$ | — |
| $nC_4H_{10}$ | 0.6 |
| $iC_5H_{12}$ | — |
| $nC_5H_{12}$ | 1.0 |
| $iC_6H_{14}$ | 7.7 |
| $nC_6H_{14}$ | 61.8 |
| Benzene | 27.1 |
| Total Hexane Conversion | 30.5 |
| Benzene Selectivity | 89 |

This deactivated catalyst was then regenerated by placing it in an oven in air at 650 deg. F. for 16 hr and 950 deg. F. for 1 hr.

The regenerated catalyst was tested for hexane conversion, and the activity of the regenerated catalyst relative to the fresh catalyst was 1.2. The hexane conversion, benzene selectivity, and reaction products for the regenerated catalyst are shown in Table 3.

TABLE 3

N-Hexane Conversion at 750 deg. F. Under Atmospheric $H_2$

Catalyst, Regenerated
(Relative Activity 1.2)

| WHSV, $hr^{-1}$ | 1.0 | 2.0 |
|---|---|---|
| Reaction Products (wt %) | | |
| $CH_4$ | 1.5 | 1.8 |
| $C_2H_6$ | 0.8 | 1.0 |
| $C_3H_8$ | 1.0 | 1.3 |
| $iC_4H_{10}$ | 0.1 | 0.2 |
| $nC_4H_{10}$ | 0.9 | 1.1 |
| $iC_5H_{12}$ | 0.5 | 0.5 |
| $nC_5H_{12}$ | 2.7 | 3.3 |
| $iC_6H_{14}$ | 12.4 | 18.7 |
| $nC_6H_{14}$ | 3.2 | 6.4 |
| Benzene | 76.9 | 65.7 |
| Total Hexane Conversion | 84.4 | 74.9 |
| Benzene Selectivity | 91 | 88 | the presence of coke on the catalyst. Although an oxidation temperature of 500 deg. F. removes some of the coke, a higher temperature must be used to burn off the remaining coke.

Following regeneration A, the catalyst was deactivated by reaction of hexane in $N_2$. Again, the deactivated catalyst had a relative activity of approximately 0.2.

Regeneration B is the present invention. In the first step, the catalyst is contacted with air at 500 deg. F. for 16 hr. In the second step, the partially regenerated catalyst is contacted with air at 900 deg. F. for 1.5 hr. This resulted in a relative activity of 1.2. This relative activity is slightly greater than the relative activity of the fresh catalyst. This occurrence is not unusual and has been observed with other catalyst.

TABLE 4

L ZEOLITE REGENERATION METHODS (EXAMPLE 2)

| Catalyst | Regeneration Conditions, Time (hr)/Temp (F̃) | Total Hexane Conversion | | Relative Activity | Benzene Selectivity |
|---|---|---|---|---|---|
| | | 2.0 WHSV | 1.0 WHSV | | |
| Fresh | — | 85.0 | 92.0 | 1.0 | 89 |
| Regen A (not invention) | 16/500 | 77.3 | 91.3 | 0.8 | 89 |
| Regen B (invention) | 16/500 1.5/900 | 87.6 | 93.6 | 1.2 | 90 |
| Regen C (not invention) | 16/500 1.5/900 3/1200 | 5.0 | 7.0 | 0.1 | 70 |
| Regen* D (not invention) | 1.5/900 | 73.7 | 87.4 | 0.6 | 90 |

*New catalyst sample

This example illustrates that a coke-deactivated platinum-barium L zeolite catalyst can be completely regenerated utilizing the present invention. No chlorides were added during the regeneration process, and the regenerated catalyst contained no chloride.

EXAMPLE 2

A barium-exchanged L zeolite having 1.2% platinum was prepared by slurring 200 g of (K) L zeolite in a solution of 100 g of barium nitrate in 600 ml of water. This slurry was heated to 90 deg. C. and stirred for 30 min. This slurry was filtered and dried overnight at 250 deg. F. 20 g of the dried material was impregnated with 0.24 g platinum (as $Pt(NH_3)_4(NO_3)_2$) in 13 ml of water. The final step was to dry overnight at 250 deg. F.

The conversion of n-hexane was carried out in the same manner as Example 2.

Subsequently, the catalyst was deactivated by allowing coke to build up. Coking was done by reacting n-hexane in $N_2$. The reaction temperature as 750 deg. F.; the n-hexane WHSV was 2.0 $hr^{-1}$, and the $N_2$ flow rate was 150 ml/min. The deactivation was continued for 9 hr. Following the deactivation, the catalyst activity (in $H_2$) was again determined. The catalyst activity of the coked catalyst was found to be 0.2 relative to the fresh catalyst. The deactivated catalyst was then regenerated using one-step, two-step, and three-step methods. See Table 4.

In regeneration method A, the deactivated was regenerated using a one-step partial carbon burn procedure wherein the catalyst was contacted with air in a furnace at a temperature of 500 deg. F. for 16 hr. The result was a relative activity of only 0.8. Method A's failure to achieve a relative activity at least equal to the catalyst activity of the fresh catalyst can be attributed to This high relative activity can be attributed to removing substantially all of the coke from the catalyst while maintaining a substantial amount of the active platinum surface area in the micropores of the L zeolite. FIGS. 1 and 3 illustrate that an L zeolite catalyst regenerated using the present invention has greater than 95% of the active platinum surface area located within the micropores of the L zeolite.

Following regeneration B, the L zeolite catalyst was again deactivated by reaction with hexane in nitrogen. Method C is a three-step process for regenerating the deactivated L zeolite. In this method, the L zeolite catalyst was regenerated with air at a temperature of 500 deg. F. for 16 hr, 900 deg. F. for 1.5 hr, and 1200 deg. F. for 3 hr. The result was a nearly complete loss of activity, 0.1 relative activity. This extremely low relative activity is more likely attributable to sintering of the platinum than the presence of coke on the L zeolite. Although 1200 deg. F. can be sufficient to remove any remaining coke, it is so severe that it can result in platinum sintering, thereby agglomerating the platinum and reducing the relative activity.

In regeneration D, a separate sample of this catalyst was reduced and deactivated by reaction with hexane in nitrogen. Direct single-step regeneration oxidation at 900 deg. F. for 1.5 hr resulted in a regenerated catalyst having a relative activity of 0.6. This low relative activity was more likely caused by platinum sintering (resulting in platinum agglomeration) than by the presence of any remaining hard-to-remove coke deposits. Method D illustrates that the amount of coke present on the catalyst can have an effect on platinum sintering. Although the oxidation temperature is not severe (900 deg. F.), a substantial amount of coke is on the catalyst while the platinum is being exposed to such a temperature. The presence of this large amount of coke can cause rapid increases in the local temperatures, i.e., flame front temperatures, thereby sintering the platinum. Compare to method B where the platinum was exposed to the same temperature, yet no sintering occurred. The difference is, in method B, a substantial amount of the coke had already been removed in the first oxidation step by the time the platinum was exposed to 900 deg. F. Consequently, the flame front was more controlled and did not rapidly increase during regeneration.

That which is claimed is:

1. A halogen-free oxidation process for regenerating a sulfur-free, platinum, nonacidic L zeolite catalyst, a substantial portion of active platinum surface area positioned within micropores of said L zeolite, said catalyst having been deactivated by deposition of a carbonaceous material as a result of previous contact of said catalyst with a hydrocarbon feedstock comprising $C_6$–$C_8$ nonaromatic hydrocarbon in the presence of hydrogen under reforming conditions, said process producing a carbon dioxide-containing regeneration effluent, comprising the steps of:

(a) contacting said catalyst with a gaseous stream consisting essentially of oxygen and nitrogen and having a halogen concentration less than about 10 ppm at a first temperature sufficient to combust the carbonaceous material and ranging from about 500–700 deg. F. while maintaining greater than about 80% of said active platinum surface area within said micropores of said L zeolite;

(b) monitoring carbon dioxide concentration of said regeneration effluent and continuing to combust said carbonaceous material for a first period of time sufficient for said carbon dioxide concentration of level off, said first period being about 3 to 72 hr; and (c) contacting said catalyst with a gaseous stream consisting essentially of oxygen and nitrogen and having a halogen concentration less than about 10 ppm at a higher second temperature and for a second period time sufficient to combust greater than 80% of said carbonaceous material while maintaining at least 80% of said active platinum surface area within said micropores of said L zeolite, said second temperature ranging from about 850–950 deg. F., said second period of time ranging from about 0.5 to 10 hr.

* * * * *